L. W. OSTER & F. J. MILLER.
AUTOMOBILE BODY.
APPLICATION FILED MAR. 20, 1911.
1,021,470.
Patented Mar. 26, 1912.
2 SHEETS—SHEET 1.
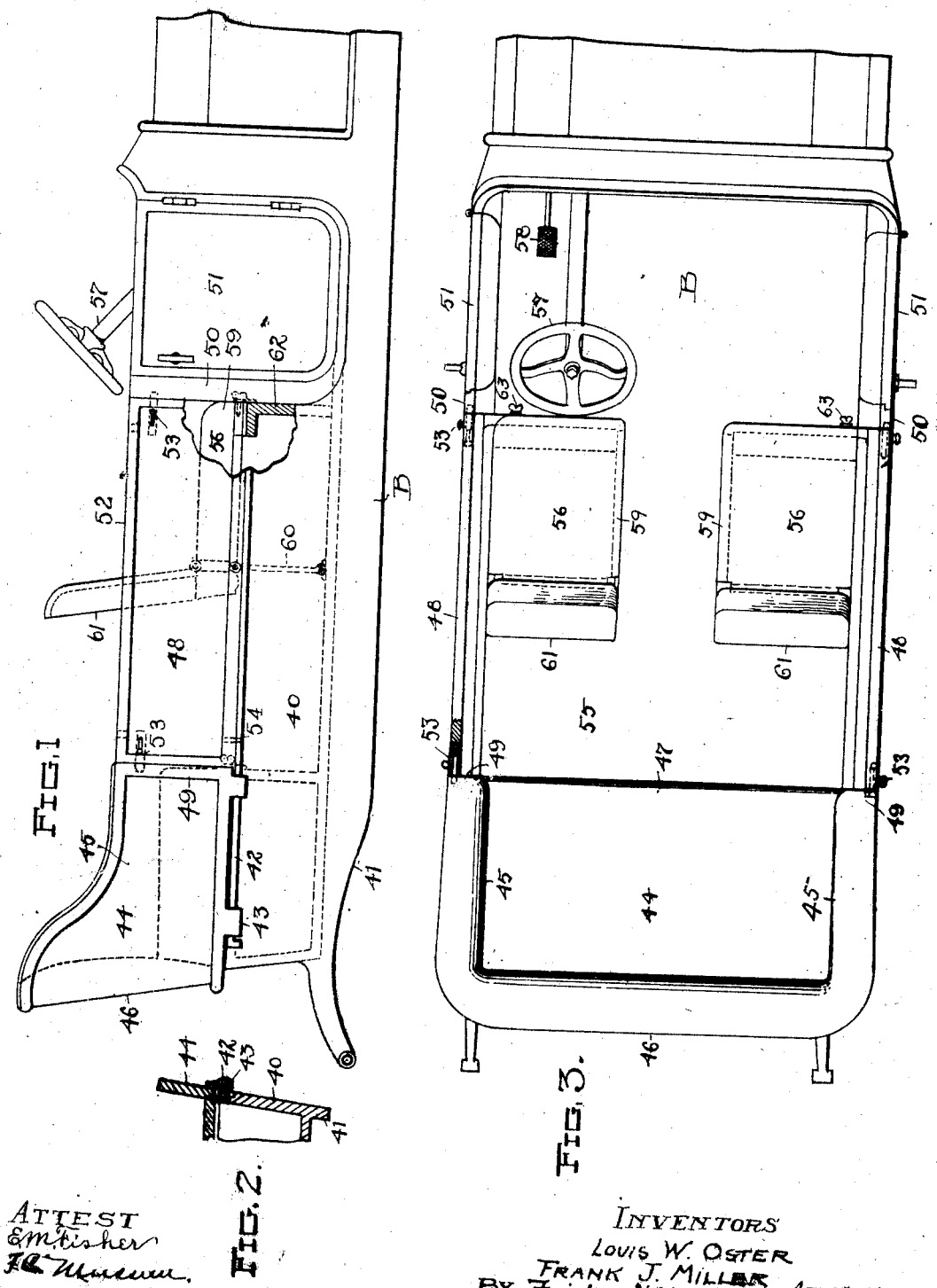
ATTEST
E. M. Fisher
INVENTORS
Louis W. Oster
Frank J. Miller
BY Fisher ATTYS.

L. W. OSTER & F. J. MILLER.
AUTOMOBILE BODY.
APPLICATION FILED MAR. 20, 1911.
1,021,470.
Patented Mar. 26, 1912.
2 SHEETS—SHEET 2.
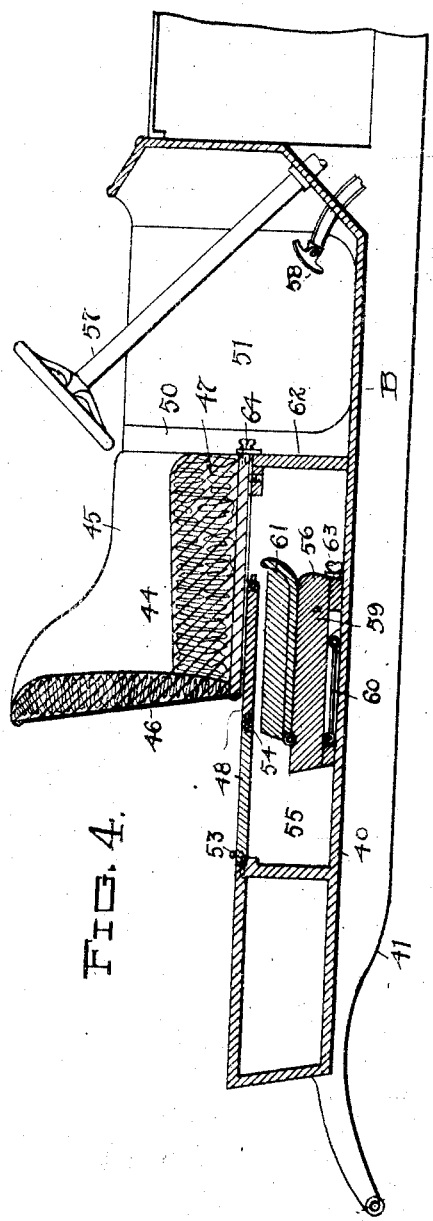
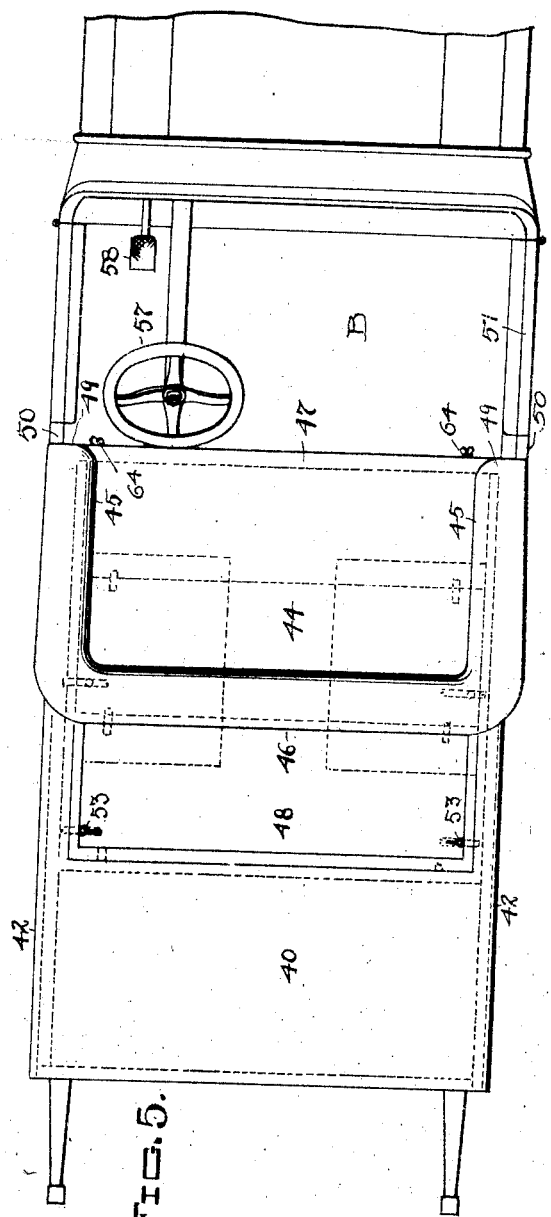
ATTEST
E. M. Fisher
J. C. Mussun
INVENTORS
Louis W. Oster
Frank J. Miller
By Fisher Ullett ATTYS.

UNITED STATES PATENT OFFICE.

LOUIS W. OSTER AND FRANK J. MILLER, OF CLEVELAND, OHIO; SAID OSTER ASSIGNOR TO SAID MILLER.

AUTOMOBILE-BODY.

1,021,470.  Specification of Letters Patent. Patented Mar. 26, 1912.

Application filed March 20, 1911. Serial No. 615,706.

*To all whom it may concern:*

Be it known that we, LOUIS W. OSTER and FRANK J. MILLER, citizens of the United States, residing at Cleveland, in the county of Cuyahoga and State of Ohio, have invented certain new and useful Improvements in Automobile-Bodies, of which the following is a specification.

Our invention relates to automobile bodies and comprises the improvement substantially as hereinafter shown and described and particularly pointed out in the claims.

Recognizing the need and advantages of an automobile adapted to be converted into a two-passenger or so-called runabout car, or into a touring car with an extra rear seat to carry extra passengers, we have invented an automobile body in which this change may be made in the easiest and most convenient manner possible by slidably mounting the rear seat in respect to a set of foldable front seats. In so doing, our object has also been to preserve all the lines and contour of an acceptable car as well as to make a comfortable riding car with ample room for the occupants of the car in either of its changeable forms.

Other objects are also embodied in the specific construction of car body, all as hereinafter more specifically described.

In the accompanying drawings, Figure 1 is a side elevation of our improved automobile body showing the seats separated and unfolded. Fig. 2 is a sectional detail, and Fig. 3 is a plan view of Fig. 1. Fig. 4 is a sectional view longitudinally of the car body showing the seats folded for use as a single seat car, and Fig. 5 is a plan view of Fig. 4.

In detail, car body B comprises a box 40 forming an integral or fixed part of chassis frame 41 and this box may be higher or lower than as shown. Guide flanges 42 at either side of box 40 are slidably engaged by brackets 43 on slidable seat 44 which comprises side arms 45, a back portion 46 and a fixed seat portion 47. This seat 44 may be used either as a front or a rear seat, and in Figs. 1 and 3, it is shown as occupying a rear portion on body B being locked thereat by panels 48 which form doors for either the sides or top of the body dependent upon whether a single or plural seat body is wanted. Thus in Figs. 1 and 3, panels 48 are fixed between the front border edge 49 of seat 44 and the fixed upright or jamb 50 for front door 51, thereby locking said seat from forward movement and providing an inclosing side portion having a top border edge 52 flush and continuous with the top edge of door 51. Suitable bolts 53 and dowel pins 54 carried by panels 48 serve to aline and lock the same in place, either at the side or in the top of body B,—the latter position being shown in Figs. 4 and 5. Here the panels are mounted crosswise of the body to cover the compartment or recess 55 therein. This recess is utilized to provide the necessary space for the feet when seat 44 is in use as a rear seat, and also to confine the front seats 56 when folded and lowered to permit said seat 44 to occupy a front position in close relation to steering wheel 57 and other controlling devices represented in part by foot pedal 58. The steering wheel and other controlling means for the automobile are necessarily at the front and fixed in respect to the body, and therefore, a practical convertible body of this kind is only obtained by mounting a so-called rear seat movably back and forth in respect to a front seat or seats and to said controlling parts. Obviously, the chauffeur cannot be shifted out of reach of his controlling means.

A pair of separate front seats 56 are shown with an aisle or space between them to give access to the rear from the front. Each seat 56 comprises a seat portion 59 pivotally connected with a plate 60 hinged to the floor or bottom of box 40, and a back portion 61 is hinged to seat portion 59. When unfolded, each seat 56 rests at its front edge upon cross wall 62 of box 40 and is locked in this position by any suitable device, such as a thumbnut or screw clip 63. In unfolding operations, seats 56 swing forward and to the required higher plane necessary for seating purposes, all as brought about by hingeing plate 60. When seats 56 are lowered, and compartment 55 is covered by panels 48, seat 44 may be moved forwardly into exactly the same relation and position sustained formerly by seats 56, and then the side arms 45 abut against jamb 50 and the seat is locked in this position by thumbnuts or clips 64, see Figs. 4 and 5.

We claim:

1. An automobile body comprising a box and a set of seats mounted thereon one behind the other, the forward of said seats being adapted to fold within said body and the rearward of said seats adapted to be moved to the position occupied by said forward seat, panels for the top of said box adapted to be placed lengthwise at the sides of said body to provide a foot compartment between said seats when both are in use, and said body having uprights at either side in line with the sides of one of said seats and means to fasten said panels between said uprights and said rear seat.

2. An automobile body having side doors and supporting uprights therefor, a foldable front seat, and a slidable rear seat adapted to cover said front seat and abut against said uprights, and movable side panels adapted to fit between said uprights and said rear seat when retired to the rear on said body.

3. In automobiles, a body and steering and controlling means therein at its front, a side door opposite said means, a pair of foldable front seats spaced apart centrally of said body to provide an aisle between the same, and a slidable seat the full width of said body adapted to be moved forward to the position vacated by said foldable seats, an upright next to said door and means to lock said rear seat against said upright.

4. An automobile body and a rear seat and two separate foldable front seats therein, said rear seat slidable on said body to the position occupied by said front seats, separate panels for the sides of said body adapted to lock said rear seat in place and to form sides for said front seats and means to lock said panels detachably in position.

5. An automobile body having a movable rear seat and a pair of separately foldable front seats and horizontal guides projecting laterally at either side of said body at the outside thereof on which said rear seat is slidably mounted, and interchangeable panels adapted to be placed at the side of said body or across the same according to the position of the said rear seat, substantially as shown and described.

6. An automobile having a body and controlling means fixed therein and a pair of separate removable and foldable seats at its sides and front spaced apart to provide an aisle between, in combination with a rear seat and guides at the side of the said body on which said front seat is adapted to slide and occupy the position vacated by said foldable seats and panels removably secured at the sides of said body and extending from the rear seat to the front of said front seats.

7. An automobile body having side doors at its front and a foldable operator's seat in its front end next behind said doors and a slidable seat in its rear adapted to cover said operator's seat when folded, side panels engaged with the front edge of said rear seat having a top border edge continuous with and on the same plane substantially as the top border edge of said side doors, and removably secured to the frame of said body at their front ends, thereby providing continuous sides to said body.

8. In automobiles, a body and steering and controlling means therein, an operator's seat having a hinged support at its bottom and rear and a folding back to permit folding of said parts one upon the other, in combination with a rear seat and side supporting guides on which said seat is adapted to be moved to serve as a front seat, and separate means to positively lock said seats in their respective positions of use comprising side panels secured to the side edges of the rear seat and serving as braces therefor.

In testimony whereof we affix our signatures in presence of two witnesses.

LOUIS W. OSTER.
FRANK J. MILLER.

Witnesses:
E. M. FISHER,
R. B. MOSER.